US005632838A

United States Patent [19]
Weidner

[11] Patent Number: 5,632,838
[45] Date of Patent: May 27, 1997

[54] COATING COMPOSITION FOR PULTRUSION/EXTRUSION PROCESS AND METHOD OF APPLICATION

[75] Inventor: Richard A. Weidner, St. John, Ind.

[73] Assignee: The Sherwin-Williams Company, Cleveland, Ohio

[21] Appl. No.: 289,157

[22] Filed: Aug. 11, 1994

Related U.S. Application Data

[63] Continuation-in-part of Ser. No. 287,319, Aug. 8, 1994.
[51] Int. Cl.$^6$ .............................. B05C 11/02; B05C 3/12
[52] U.S. Cl. .......................... 156/180; 118/125; 118/405; 118/419; 118/420; 156/166; 156/244.24; 156/433; 156/441; 156/578; 264/135; 264/137; 425/114
[58] Field of Search ...................... 156/166, 180, 156/181, 433, 441, 431, 432, 578, 244.11, 244.24; 118/420, 419, 405, 125; 425/114; 264/135, 137, 211.13; 427/256

[56] References Cited

U.S. PATENT DOCUMENTS

| 3,556,888 | 1/1971 | Goldsworthy ................... 156/181 X |
| 4,394,338 | 7/1983 | Fuwa . |
| 4,681,722 | 7/1987 | Carter et al. . |
| 4,883,690 | 11/1989 | Carter . |
| 4,938,823 | 7/1990 | Balazek et al. . |
| 5,326,592 | 7/1994 | Goewey et al. . |
| 5,492,583 | 2/1996 | Fingerson et al. ................... 156/180 |

*Primary Examiner*—Jeff H. Aftergut
*Attorney, Agent, or Firm*—Heidi A. Boehlefeld; Robert E. McDonald

[57] ABSTRACT

A continuous process for manufacturing a coated fiber reinforced pultruded article or coated extrudate and the coating composition for use in this process. The coating composition includes an isocyanate resin, at least one active hydrogen-containing resin and at least one solvent having an evaporation rate equal to or less than about 0.5. The process and coating composition of the present invention produce fiber reinforced plastic articles having smooth, adherent surface coatings.

17 Claims, No Drawings

COATING COMPOSITION FOR PULTRUSION/EXTRUSION PROCESS AND METHOD OF APPLICATION

This application is a continuation-in-part of copending application Ser. No. 08/287,319 filed Aug. 8, 1994, pending.

BACKGROUND OF THE INVENTION

The present invention relates to a coating composition useful in coating a continuously advancing article, such as in a pultrusion process or extrusion process. This coating composition can be applied contemporaneously or in-line with the pultrusion or extrusion process.

The pultrusion process generally involves the steps of drawing a bundle of filaments from a source of such filaments; wetting these filaments or reinforced fibers and impregnating them with a preferably thermosetting resin by passing the filaments through a resin bath in an open tank or through a resin impregnating die; pulling the resin-wetted and impregnated bundle through a heated shaping die to align the fiber bundle and to manipulate it to the proper cross-sectional configuration; and then curing the resin while maintaining tension on the filaments. Since the fibers progress completely through the pultrusion process without being cut or chopped, the resulting products have exceptionally high longitudinal strength.

It is often desirable to apply a coating, such as paint, to the pultruded article. Typical systems for applying paint to the cooled pultruded article include spray guns and rollers. However, these systems result in the loss of a significant amount of excess coating composition and are time consuming. In-line coating apparatus have been developed which permit the application of a coating of a predetermined thickness to the hot pultruded article as the pultruded article advances through the apparatus. An example of such an in-line coating apparatus is described in U.S. Pat. No. 4,883,690, incorporated herein by reference.

The present invention is directed to a coating composition for use in coating the hot pultruded article shortly after it exits the heated shaping die. In a typical pultrusion process, the pultruded article exits the heated shaping die at a temperature of about 300° F. The surface of the pultruded article is then water or air cooled to about 150–180° F. before the coating is applied. However, the surface temperature of the pultruded article quickly rises to 200–280° F. due to the residual heat of the pultruded article. The coating composition must be capable of withstanding these high temperatures to produce an adherent, blister-free coating of the desired thickness on the pultruded article.

It is an object of the present invention, therefore, to provide a coating composition having sufficient viscosity to provide the desired coating thickness on the pultruded article as the pultruded article advances through the in-line coating apparatus. It is a further object of the present invention to provide a coating composition for use in an in-line coating apparatus that produces an adherent, blister-free coating upon cure.

SUMMARY OF THE INVENTION

The present invention is directed to a process for continuously forming a coated fiber reinforced plastic article including the steps of:

(1) continuously drawing a fiber reinforcing material through an impregnating station;

(2) passing a continuous supply of liquid resin material to the impregnating station;

(3) impregnating the fiber reinforcing material with the liquid resin at the impregnating station to form a continuous impregnated uncured article;

(4) continuously drawing the uncured article through a forming and curing die;

(5) forming the uncured article to a finished cross-sectional shape and curing the resin to a hardened condition to form a fiber reinforced article;

(6) continuously drawing the fiber reinforced article through a coating station; and (7) applying a coating composition to at least a predetermined portion of the surface of the fiber reinforced article.

The coating composition of the present invention contains an isocyanate resin; at least one active hydrogen-containing resin; and at least one solvent having an evaporation rate less than about 0.5. The viscosity of the coating composition is at least about 15,000 cps (at 25° C. using a Brookfield viscometer, spindle 7 and 20 rpm.) and the solids content is about 60–90% by weight. Preferably, the solvent contains a dibasic ester and the active hydrogen-containing resin contains a hydroxy-functional acrylic resin. The coating composition of the present invention may also contain silica, pigments, additional solvents, thixotropic additives and UV absorber.

DETAILED DESCRIPTION OF THE INVENTION

According to the present invention, fiber reinforced articles may be coated with a paint or coating composition during the pultrusion process used to form the fiber reinforced articles. This method generally involves the following steps. Fiber reinforcing material, such as continuous strands or mat, are continuously drawn or pulled through a resin impregnating station. This impregnating station may be a die or a tank through which the strands or mat are drawn. A thermoplastic or thermosetting resin, preferably a thermosetting resin, is continuously supplied to die or tank so that the fiber reinforcing material is impregnated with the resin to form an uncured resin-impregnated fiber reinforced article. The uncured article is then continuously drawn through a forming and curing die. This forming and curing die shapes the uncured article into the desired cross-sectional configuration or profile and the resin is cured to a hardened condition. The resin is usually cured by the application of heat from the die, but may also be cured by chemical reaction.

After the resin is cured to a hardened state, the fiber reinforced article is then continuously drawn through a coating station. This coating station may be a die to which the coating composition is continuously supplied, or a tank containing coating composition. The coating composition is applied to the fiber reinforced article as it is being drawn though the die or tank. Typically, as the article enters the die or tank, the surface temperature of the article is in the range of about 150–280° F. If the coating station consists of a die and a coating apparatus such as that described in U.S. Pat. No. 4,883,690, incorporated herein by reference, it is possible to apply the coating composition to the entire surface of the article or to a predetermined section or sections of the surface of the article as the article passes through the coating station.

The coating composition of the present invention may also be applied to the surface of an extruded article as it emerges from an extrusion die. According to this method, a coating apparatus such as that described in U.S. Pat. No.

5,326,592, incorporated herein by reference, is attached to or located downline from the extrusion die. The coating composition is continuously supplied to the coating apparatus. After the extrudate exits the extrusion die, the extrudate enters and continuously passes through the coating apparatus. As the extrudate passes through the coating apparatus, the coating composition is applied to the entire surface of the extrudate or to a predetermined section or sections of the surface of the extrudate. The extrudate may be formed from a thermoplastic or a thermosetting resin, and may contain reinforcing fibers, filaments, webbing or the like.

The coating composition of the present invention generally contains an isocyanate resin, at least one active hydrogen-containing resin and at least one slow evaporating solvent, and has a viscosity of at least about 15,000 cps at about 60–90% solids by weight. Preferably, the viscosity of the coating composition is in the range of about 15,000 cps to about 25,000 cps at about 70–80% solids by weight. The coating composition may also contain thixotropic additives, UV absorbers and pigments.

The slow evaporating solvents useful in the present invention include those solvents having an evaporation rate less than or equal to about 0.5, and which do not contain hydroxyl groups. Evaporation rate is a measure of the length of time required for a given amount of a substance to evaporate, compared with the time required for an equal amount of ethyl ether or n-butyl acetate to evaporate (i.e., the evaporation rate of n-butyl acetate is 1.0). Examples of such slow evaporating solvents include methyl isoamyl ketone, methyl amyl acetate, methoxy propyl acetate, amyl acetate (primary), methyl n-amyl ketone, isobutyl isobutyrate, cyclohexanone, diisobutyl ketone, ethyl 3-ethoxypropionate, n-methyl-2-pyrolidone, n-butoxyethyl acetate, 2-ethylhexyl acetate, isophorone, diethylene glycol monoethyl ether acetate and dibasic esters, and mixtures thereof. Preferably, the evaporation rate of the solvent is less than 0.01. More preferably, the slow evaporating solvent of the coating composition of the present invention is a dibasic ester. DBE-9 from Dupont, a mixture of dimethyl adipate, dimethyl glutarate and dimethyl succinate, is an example of a commercially available dibasic ester. Aromatic solvents such as AROMATIC 100 and AROMATIC 150, which are mixtures of C8–C10 alkyl substituted benzenes commercially available from Exxon Corp., are also useful slow evaporating solvents. In addition to the slow evaporating solvent, the coating composition of the present invention may contain additional solvents. If additional solvents are used, the amount of solvent having a slow evaporating rate contained in the coating composition should be at least about 60% by weight based on the total weight of solvent. For example, butyl acetate may be used in combination with a dibasic ester.

Representative polyisocyanate useful in the present invention include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyantomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4-diphenyl, 1,5-naphthalene and 1,4-naphthanene diisocyanates; the aliphatic-aromatic compounds such as 4,4-diphenylene methane, 2,4-or 2,6- toluene, or mixtures thereof, 4,4'-toluidine, and 1,4xylylene diisocyanates; the nuclear substituted aromatic compounds such as dianisdine diisocyanate, 4,4-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4' diphenyl-dimethyl methane-2, 2',5,5'-tetraisocyanate; the polymerized polyisocyanates such as tolylene diisocyanate dimers and trimers, and other various polyisocyanates containing biuret, urethane, and/or allophanate linkages. For urethane coatings having good weatherability, aliphatic polyisocyanates are preferred.

The active hydrogen-containing materials useful in this invention have at least one one active hydrogen group per molecule. Active hydrogen functionality means those reactive groups described by Kohler in J. Amer. Chem. Soc., 49, 3181 (1927) and include -OH, —COOH, —SH, and —NH. Preferred are the hydroxy-functional materials. Representative hydroxy-functional polymers include the hydroxy-functional polyethers, polyesters, acrylics, polyurethanes, and polycaprolactones. More preferably, the hydroxy-functional polymer is an acrylic polymer. Especially preferred are the hydroxy-functional acrylic polymers in a slow-evaporating solvent.

The composition may also contain pigments. These pigments can be introduced by first forming a mill base with the active hydrogen-containing resin utilized in the composition or with other compatible polymers by conventional techniques, such as sandgrinding, ball-milling, attritor grinding, high speed dispersion or two roll milling to disperse the pigments.

Other additives that may be contained in the coating composition of the present invention include flow control agents, UV absorbers, thixotropic additives and silica.

In general, two-component compositions prepared in accordance with the present invention contain:

COMPONENT 1: (a) about 10–25 parts by weight of active hydrogen-containing resin (at 100% solids); (b) about 20–35 parts by weight of solvent having an evaporation rate of less than 0.5; (c) about 5–45 parts by weight of silica; (d) about 0–40 parts by weight pigment, and wherein the parts by weight of ingredients (a)–(d) is based on the total weight of Component 1; and COMPONENT 2: isocyanate resin, wherein the ratio of equivalents of isocyanate resin reactive functionality (NCO) to equivalents of active hydrogen-containing resin reactive functionality (preferably, —OH) is from about 3:1 to about 1:1, and preferably about 2:1.

EXAMPLES 1–5

The coating composition of the present invention can be illustrated by way of example. Examples 1–5 are two-component coating compositions prepared in accordance with the present invention. Component I is the basis of the coating and consists of a hydroxy-functional resin, solvents, pigments, fillers, flow agents and other products used in formulating the coating composition. The hydroxy-functional resin of Component I is an acrylic resin prepared by conventional addition polymerization from the monomers methyl methacrylate, butyl acrylate, hydroxy ethyl methacrylate, styrene, methacrylic acid glacial and an initiator. Hydroxy-functional Resin A contains 50% by weight of dibasic ester solvent, DBE9. Component II is an isocyanate resin which is reacted with Component I at a mole ratio of substantially two moles of isocyanate to one mole of hydroxyl group present in Component I to form the coating on the pultruded article. Table I lists the compositions of Examples 1–5 in weight percent.

The coating composition was applied to a fiber reinforced article after the article exited a forming and curing die. The surface temperature of the article was in the range of 150–180° F. A coating die was used to apply the coating composition to the article. The compositions of Examples 1–5 produced smooth, blister-free and uniform coatings on the pultruded article.

EXAMPLES 6–9

The coatings of Examples 6–9 were prepared substantially in accordance with the procedure of Examples 1–5. The Hydroxy-functional Resin B of Component I is an acrylic resin prepared by conventional addition polymerization from the monomers methyl methacrylate, butyl acrylate, hydroxy ethyl methacrylate, styrene, methacrylic acid glacial and an initiator. Hydroxy-functional Resin B contains 40% by weight of butyl acetate solvent. The coatings of Examples 6 and 9 were unacceptable because of blistering on the surface of the coating which was most likely caused by rapid solvent evaporation. The coatings of Examples 7 and 8 were also unacceptable because of cracking and non-uniform coating application respectively. Examples 6–9 illustrate that both the rate of solvent evaporation and the viscosity of the coating composition are important to producing acceptable coatings on pultruded articles by the process of the present invention.

While the invention has been shown and described with respect to a particular embodiment thereof, this is for the purpose of illustration rather than limitation, and other variations and modifications of the specific embodiment herein shown and described will be apparent to those skilled in the art and are within the intended spirit and scope of the invention.

What is claimed is:

1. A process for continuously forming a coated fiber reinforced plastic article comprising the steps of:

a. continuously drawing a fiber reinforcing material through an impregnating station;

b. passing a continuous supply of liquid thermoplastic or thermosetting resin material to said impregnating station;

c. impregnating said fiber reinforcing material with said liquid thermoplastic or thermosetting resin at said impregnating station to form a continuous impregnated article;

d. continuously drawing said impregnated article through a forming and hardening die;

e. forming the impregnated article to a finished cross-sectional shape and causing said thermoplastic or thermosetting resin to set to a hardened condition to form a fiber reinforced article;

f. continuously drawing said fiber reinforced article through a coating station;

g. passing a continuous supply of a coating composition to said coating station; and h. applying said coating composition to at least a predetermined portion of the surface of said fiber reinforced article as said fiber reinforced article continuously passes through said coating station; said coating composition having a viscosity of at least 15,000 cps at 25° C. and a solids content of about 60–90% by weight and comprising:

(i) an isocyanate resin;

(ii) at least one active hydrogen-containing resin; and (iii) at least one solvent having an evaporation rate equal to or less than about 0.5 and wherein said solvent comprises at least about 60% by weight of the total solvent present.

2. The process of claim 1 wherein causing said resin to set to a hardened state comprises applying heat to said resin.

3. The process of claim 1 wherein said active hydrogen-containing resin comprises a hydroxy-functional resin.

4. The process of claim 3 wherein said hydroxy-functional resin comprises an acrylic resin.

5. The process of claim 1 wherein said solvent has an evaporation rate less than about 0.01.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| COMPONENT I |  |  |  |  |  |  |  |  |  |
| Hydroxy-functional Resin A | 40.1 | 37.0 | 42.9 | 38.5 | 30.3 | — | — | — | — |
| Hydroxy-functional Resin B | — | — | — | — | — | 25.0 | 23.6 | 24.3 | 25.5 |
| Cyclohexanone | 4.1 | 3.5 | 3.2 | 3.6 | 3.6 | 2.9 | 3.9 | 4.1 | 6.3 |
| Silica | 4.7 | 41.7 | 39.2 | 44.3 | 30.4 | 5.5 | 8.5 | 5.4 | 5.6 |
| DBE9 | 10.5 | 9.2 | 10.8 | 9.3 | 9.7 | 8.0 | 11.1 | 11.5 | 5.2 |
| Tinuvin 292 | 0.7 | 0.6 | 0.7 | 0.6 | 0.6 | 0.5 | 0.5 | 0.5 | 0.5 |
| Bentone | 1.9 | 2.3 | 3.3 | 2.1 | 1.6 | 0.4 | — | 0.4 | 0.2 |
| Pigments | 38.1 | 5.8 | — | 1.6 | 23.8 | 58.8 | 51.8 | 53.3 | 56.0 |
| COMPONENT II |  |  |  |  |  |  |  |  |  |
| Desmodur N-100 NCO:OH | 1.9:1 | 1.9:1 | 1.7:1 | 1.9:1 | 2.1:1 | 2.5:1 | 2.5:1 | 2.1:1 | 2.9:1 |
| Mixed Viscosity | 21,000 | 16–25,000 | 16–25,000 | 16–25,000 | 16–25,000 | 18,000 | 8,000 | 10,000 | 11,000 |
| NVM (After Mix) | 74.22 | 72.05 | 68.37 | 70.00 | 74.18 | 80.3 | 78.6 | 77.6 | 79.6 |
| Results | Good | Good | Good | Good | Good | Small blisters | Cracking under 10X magnification | No blistering, not complete flow | Blistering |

6. The process of claim 1 wherein said solvent comprises a dibasic ester.

7. The process of claim 1 wherein said coating composition further comprises silica.

8. The process of claim 1 wherein said coating composition further comprises at least one pigment.

9. The process of claim 1 wherein said coating composition further comprises a UV absorber.

10. A process for continuously forming a coated extrudate comprising the steps of:

a. forming an extrudate;

b. continuously drawing said extrudate through a coating apparatus;

c. passing a continuous supply of a coating composition to said coating apparatus; and d. applying said coating composition to at least a predetermined portion of the surface of said extrudate as said extrudate continuously passes through said apparatus; said coating composition having a viscosity of at least 15,000 cps at 25° C. and a solids content of about 60–90% by weight and comprising:

(i) an isocyanate resin, (ii) at least one active hydrogen-containing resin; and (iii) at least one solvent having an evaporation rate equal to or less than about 0.5 and wherein said solvent comprises at least about 60% by weight of the total solvent present.

11. The process of claim 10 wherein said active hydrogen-containing resin comprises a hydroxy-functional resin.

12. The process of claim 11 wherein said hydroxy-functional resin comprises an acrylic resin.

13. The process of claim 10 wherein said solvent has an evaporation rate less than about 0.01.

14. The process of claim 10 wherein said solvent comprises a dibasic ester.

15. The process of claim 10 wherein said coating composition further comprises silica.

16. The process of claim 10 wherein said coating composition further comprises at least one pigment.

17. The process of claim 10 wherein said coating composition further comprises a UV absorber.

* * * * *

UNITED STATES PATENT AND TRADEMARK OFFICE
CERTIFICATE OF CORRECTION

PATENT NO. : 5,632,838
DATED : May 27, 1997
INVENTOR(S) : Weidner

It is certified that error appears in the above-identified patent and that said Letters Patent is hereby corrected as shown below:

Column 3, line 67, "4,4-diphenylether" should be --4,4'-diphenylether--.

Signed and Sealed this

Fourth Day of January, 2000

Attest:

Attesting Officer

*Acting Commissioner of Patents and Trademarks*